(12) United States Patent
Katou et al.

(10) Patent No.: US 7,469,581 B2
(45) Date of Patent: Dec. 30, 2008

(54) TIRE VALVE UNIT

(75) Inventors: Michiya Katou, Ichinomiya (JP);
Yasuaki Hattori, Iwakura (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 11/784,641

(22) Filed: Apr. 9, 2007

(65) Prior Publication Data

US 2008/0083272 A1    Apr. 10, 2008

(30) Foreign Application Priority Data

Oct. 10, 2006    (JP)    ............................... 2006-276857

(51) Int. Cl.
*B60C 23/02*    (2006.01)
(52) U.S. Cl. .................................... 73/146.8
(58) Field of Classification Search ............. 73/146, 73/146.8; 152/427; 340/442
See application file for complete search history.

(56) References Cited

U.S. PATENT DOCUMENTS

| 3,712,326 | A | 1/1973 | Thacker |
| 4,836,235 | A * | 6/1989 | Pagani ........................ 137/223 |
| 5,094,263 | A * | 3/1992 | Hurrell et al. ................ 137/224 |
| 7,107,830 | B1 | 9/2006 | Yu et al. |
| 7,320,247 | B2 * | 1/2008 | Katou et al. ................... 73/146 |

FOREIGN PATENT DOCUMENTS

| DE | 20 2006 003 888 U1 | 7/2006 |
| EP | 1 736 328 A1 | 12/2006 |
| JP | 2001-174356 | 6/2001 |
| JP | 2007153298 A * | 6/2007 |

* cited by examiner

*Primary Examiner*—Andre J Allen
(74) *Attorney, Agent, or Firm*—Patterson, Thuente, Skaar & Christensen, P.A.

(57) ABSTRACT

A tire valve unit is secured to a securing hole provided in a rim of a wheel of a vehicle. The tire valve unit includes a tire valve and a tire sensor. The tire valve includes a valve stem and an elastic cylindrical member encompassing the valve stem. The elastic cylindrical member has an annular securing groove in an outer circumferential surface of the elastic cylindrical member. A portion of the rim around the securing groove is fitted in the securing groove when the elastic cylindrical member is passed through the securing hole. The tire sensor is fixed to the valve stem. The tire sensor is arranged in the interior of a tire attached to the rim and capable of detecting the condition of the tire when the tire valve unit is secured to the rim. The elastic cylindrical member defines an annular space around the valve stem. The annular space extends from a position corresponding to the securing groove in an axial direction of the valve stem to communicate with the interior of the tire.

7 Claims, 3 Drawing Sheets

TIRE VALVE UNIT

BACKGROUND OF THE INVENTION

The present invention relates to a tire valve unit that is used in a tire condition monitoring apparatus and has an appropriate securing structure by which the tire valve unit is secured to a rim of a wheel of a vehicle.

A tire condition monitoring apparatus of a vehicle is known. The device allows monitoring of the condition of the tires of the vehicle such as air pressure from the passenger compartment. Various types of tire valve units used in the tire condition monitoring apparatus have been proposed. One such tire valve unit typically includes a tire valve, an elastic cylindrical member, and a tire sensor. The tire valve has a valve body and a valve stem extending from the valve body. The valve stem is a hard cylindrical member formed of metal. The elastic cylindrical member is formed of, for example, rubber and encompasses the valve stem. The tire sensor is, for example, a air pressure sensor and installed in the elastic cylindrical member. The tire valve unit is secured to the rim of a wheel of the vehicle through the elastic cylindrical member.

This type of tire valve unit is described in, for example, Japanese Laid-Open Patent Publication No. 2001-174356. In the tire valve unit, an elastic cylindrical member encompasses the outer circumferential surface of a valve stem in such a manner that the elastic cylindrical member tightly contacts the outer circumferential surface of the valve stem. An annular securing groove, which extends circumferentially, is defined in the outer circumferential surface of the elastic cylindrical member. A tire valve is secured to the rim of a tire through snap-in attachment. Specifically, a portion (a securing portion) of the rim around the securing groove is fitted in the securing groove of the elastic cylindrical member. In this state, an engagement portion of a tire sensor is joined with an end of the elastic cylindrical member located inside the rim. The tire sensor is thus secured to the tire valve.

To secure the tire valve unit to the rim, the elastic cylindrical member must be held in a compressed state when being passed through a valve securing hole. However, the hard valve stem, which is arranged radially inward from the elastic cylindrical member, makes it difficult to compress the elastic cylindrical member in a radially inward direction. This hampers securing of the tire valve unit to the rim.

Further, the rim of a wheel of a vehicle, to which the tire valve unit is secured, receives great shock or vibration caused by traveling of the vehicle. Therefore, to prevent the tire valve unit from separating from the rim and improve sealing performance between the tire valve unit and the rim, the tire valve unit must be reliably secured to the rim.

SUMMARY OF THE INVENTION

Accordingly, it is an objective of the present invention to provide a tire valve unit that can be easily and reliably secured to a rim of a wheel of a vehicle.

To achieve the foregoing objective and in accordance with one aspect of the present invention, a tire valve unit secured to a securing hole provided in a rim of a wheel of a vehicle is provided. The tire valve unit includes a tire valve and a tire sensor. The tire valve includes a hard cylindrical member and an elastic cylindrical member encompassing the hard cylindrical member. The elastic cylindrical member has an annular securing groove in an outer circumferential surface of the elastic cylindrical member. A portion of the rim around the securing groove is fitted in the securing groove when the elastic cylindrical member is passed through the securing hole. The tire sensor is fixed to the hard cylindrical member. The tire sensor is arranged in the interior of a tire attached to the rim and capable of detecting the condition of the tire when the tire valve unit is secured to the rim. The elastic cylindrical member defines an annular space around the hard cylindrical member. The annular space extends from a position corresponding to the securing groove in an axial direction of the hard cylindrical member to communicate with the interior of the tire.

DETAILED DESCRIPTION OF THE PREFERRED EMBODIMENTS

An embodiment of the present invention will now be described with reference to the attached drawings.

Figure 1:
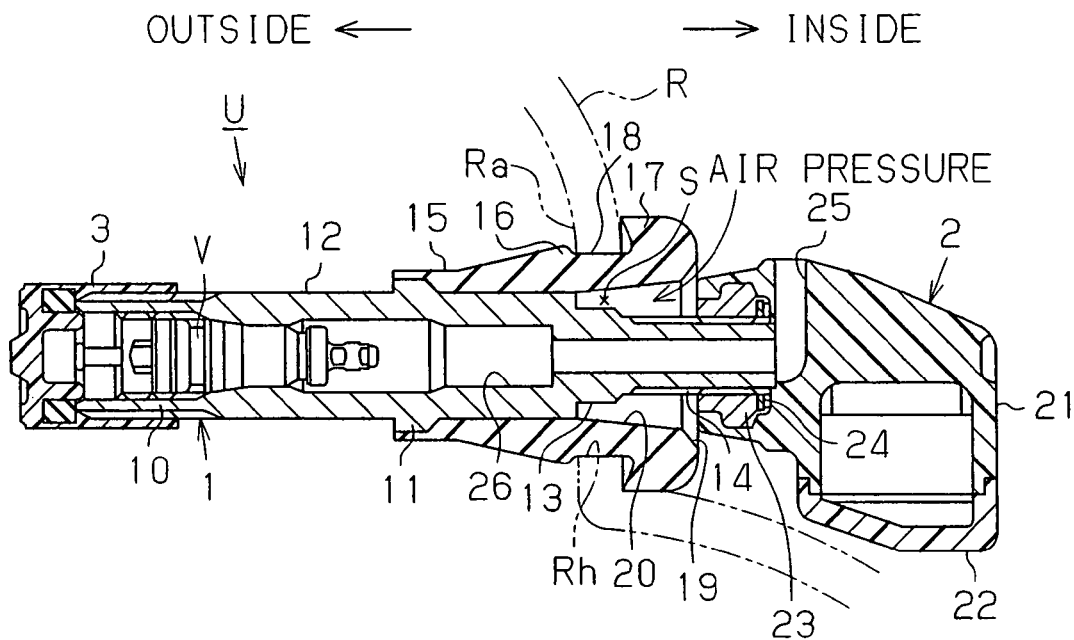
FIG. 1 is a cross-sectional view showing a tire valve unit according to the present invention.
Figure 2:
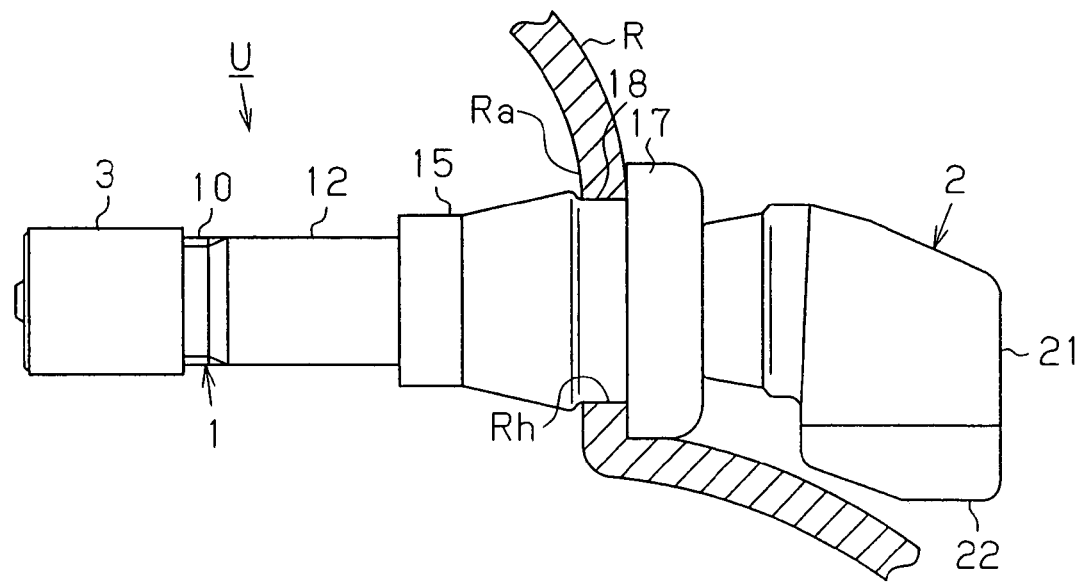
FIG. 2 is a side view showing the tire valve unit of FIG. 1 in a secured state.
Figure 3:
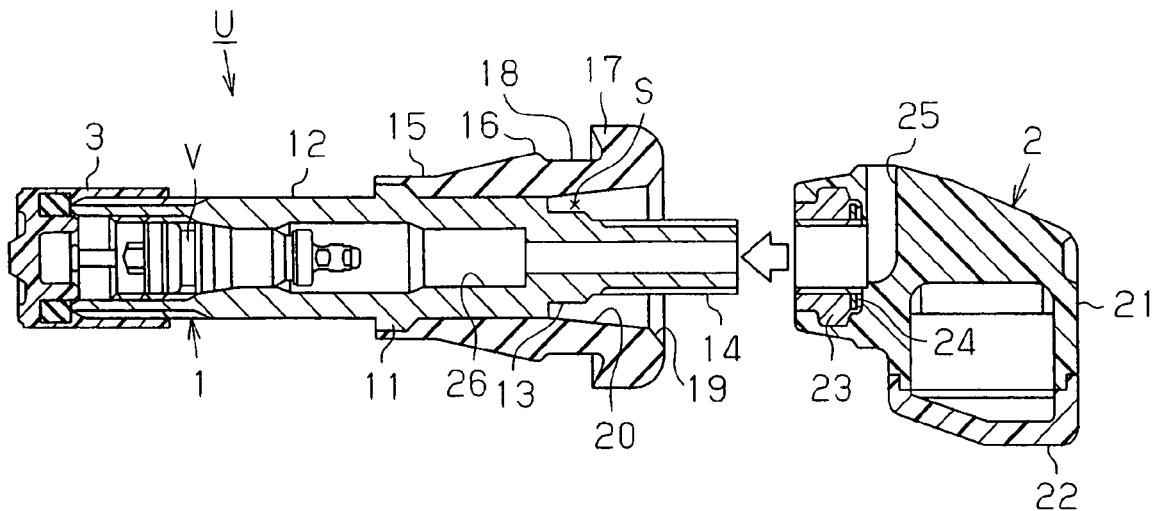
FIG. 3 is a cross-sectional view showing the tire valve unit of FIG. 1 before being assembled.

FIGS. 1 to 3 show a tire valve unit U according to one embodiment of the present invention. The tire valve unit U is used in a tire condition monitoring apparatus that monitors the condition of the tires of a vehicle such as the air pressure or the temperature in the tires. The tire valve unit U includes a tire valve 1 and a tire sensor 2 and is secured to a valve securing hole Rh defined in a rim R of a vehicle wheel.

The tire valve 1 has a valve body 10 formed of metal. A valve mechanism component V is received in the valve body 10. The valve body 10 includes a cylindrical valve stem 12. Although the valve stem 12 is formed of metal, the valve stem 12 may be formed of resin as long as the valve stem 12 is a hard cylindrical member. The valve stem 12 has a proximal portion located inside the rim R when the tire valve unit U is secured to the rim R. The proximal portion of the valve stem 12 has a small diameter portion 13. A flanged projection 11 is formed in a longitudinal central portion of the valve stem 12. A threaded portion 14 is formed in the outer circumferential surface of the small diameter portion 13.

An elastic cylindrical member 15 encompasses a portion of the valve stem 12 between the proximal end and the projection 11. The elastic cylindrical member 15 is secured to a portion of the outer circumferential surface of the valve stem 12 between the projection 11 and the small diameter portion 13. The elastic cylindrical member 15 is a rubber member and has a tapered shape toward a distal portion of the valve stem 12. An annular first engagement portion 16 and an annular second engagement portion 17, which project radially outward, are formed in the outer circumferential surface of the elastic cylindrical member 15. The second engagement portion 17 is provided in a proximal portion of the elastic cylindrical member 15 and engageable with an inner side surface of the rim R. The first engagement portion 16 is spaced from the second engagement portion 17 by a distance corresponding to the thickness of the rim R in the axial direction of the elastic cylindrical member 15. The first engagement portion 16 is engageable with an outer side surface of the rim R. A securing groove 18 is defined between the first and second engagement portions 16, 17, and receives a portion (a securing portion Ra) of the rim R around the valve securing hole Rh. Although the first engagement portion 16 and the second engagement portion 17 are each shaped as an annular projection, the first and second engagement portions 16, 17 may be each formed by a plurality of projections spaced at predetermined intervals in a circumferential direction.

A recessed portion 20 having an opening 19 is provided in the elastic cylindrical member 15. When the tire valve unit U is secured to the rim R, the recessed portion 20 is located inside the rim R. The opening 19 faces the inside of the rim R, or the internal space in the tire. The diameter of the recessed portion 20 increases toward the opening 19. An annular space S is defined between the inner wall of the recessed portion 20 and the outer circumferential surface of the small diameter portion 13 of the valve stem 12. The annular space S extends from the position corresponding to the opening 19 to the position corresponding to the securing groove 18 of the elastic cylindrical member 15. The end of the elastic cylindrical member 15 at the side corresponding to the opening 19 is a free end.

Figure 4:
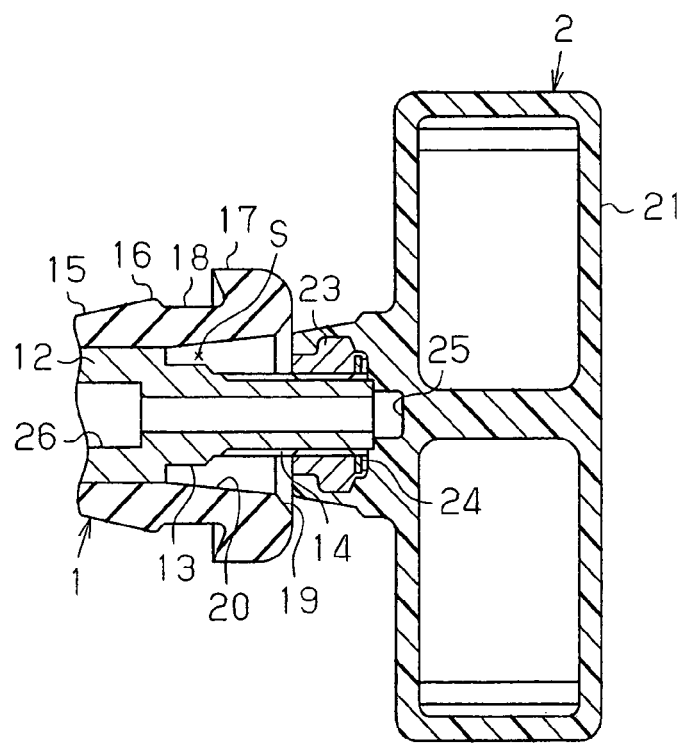
FIG. 4 is an enlarged cross-sectional view showing a main portion of the tire valve unit of FIG. 1.

As shown in FIGS. 3 and 4, a tire sensor 2 includes a resin housing 21, which accommodates a sensor unit (not shown). The housing 21 has an opening closed by a lid body 22. The sensor unit includes various types of electronic components, a battery, and an antenna. The sensor unit detects the condition of the tire (such as the internal air pressure) secured to the rim R and transmits information regarding the detected tire condition to a receiver (not shown) provided in the passenger compartment.

A nut member 23 is provided in the housing 21 and threaded to the threaded portion 14 formed in the valve stem 12. The nut member 23 is formed of metal material such as stainless steel and integrated with the housing 21 through insert molding. The nut member 23 of the illustrated embodiment is formed of metal but may be formed of resin as long as the nut member 23 is hard. A friction ring 24 is arranged in the nut member 23 for preventing the nut member 23 from becoming loose. The housing 21 is shaped in such a manner that, when the nut member 23 is secured to the valve stem 12, the opening 19 of the elastic cylindrical member 15 is maintained open. In other words, the housing 21 is shaped in such a manner as to permit elastic deformation of the elastic cylindrical member 15 in a radially inward direction and maintain air flow to the annular space S when the housing 21 is secured to the valve stem 12. With the housing 21 secured to the valve stem 12, a communication passage 25, which has an opening in an outer surface of the housing 21, communicates with a communication passage 26 defined in the valve stem 12.

Next, securing of the tire valve unit U to the rim R will be explained.

As illustrated in FIG. 3, the nut member 23 is engaged with the threaded portion 14 of the valve stem 12. This joins the tire valve 1 and the tire sensor 2, which have been prepared separately, to form an integral body. In this manner, the tire valve unit U, which is shown in FIG. 1, is provided. In this case, the valve stem 12 and the nut member 23, which are joined together, are both formed of hard material. The tire valve 1 and the tire sensor 2 are thus firmly combined with each other. Also, the nut member 23 has an anti-loosening structure, which ensures further firm joint of the tire valve 1 and the tire sensor 2. This reliably prevents the tire sensor 2 from separating from the tire valve 1 even if the tire valve unit U receives great shock or vibration caused by traveling of the vehicle.

After being assembled, the tire valve unit U is passed through the valve securing hole Rh of the rim R from a cap 3 secured to the valve body 10. At this stage, the first engagement portion 16 of the elastic cylindrical member 15 is passed through the valve securing hole Rh while being compressed by the securing portion Ra of the rim R in a radially inward direction. The securing portion Ra is thus engaged with the securing groove 18 between the first and second engagement portions 16, 17. In this manner, the tire valve 1 (the tire valve unit U) is secured to the rim R through the elastic cylindrical member 15 and the tire sensor 2 is arranged inside the rim R, or in the interior of the tire. The annular space S is provided radially inward from the elastic cylindrical member 15 and at a position corresponding to the securing groove 18. Therefore, when the first engagement portion 16 is passed through the securing hole Rh of the rim R, the first engagement portion 16 easily flexes toward the annular space S. This facilitates securing of the tire valve unit U to the rim R.

The cap 3 is then removed from the valve unit U, which has been secured to the rim R. Subsequently, the air is introduced into the interior of the tire through the communication passages 25, 26 of the valve body 10. This supplies air pressure to the annular space S through the opening 19 of the elastic cylindrical member 15. The air pressure sufficiently presses the portion of the elastic cylindrical member 15 corresponding to the securing groove 18 against the inner circumferential surface of the valve securing hole Rh. The portion of the elastic cylindrical member 15 at the side corresponding to the opening 19 is the free end, which is free from other components. The portion of the elastic cylindrical member 15 corresponding to the annular space S is thus easily enlarged radially outward and sufficiently pressed against the rim R. This reliably prevents the tire valve unit U from separating from the rim R and ensures sufficient sealing performance between the elastic cylindrical member 15 and the rim R.

The Illustrated Embodiment has the Following Advantages (1) The annular space S is defined between the inner circumferential surface of the elastic cylindrical member 15 and the outer circumferential surface of the valve stem 12. The annular space S extends from the position corresponding to the securing groove 18 toward the inside of the rim R in a longitudinal direction of the tire valve 1. Therefore, when the first engagement portion 16 of the elastic cylindrical member 15 is passed through the securing hole Rh of the rim R, the first engagement portion 16 easily flexes toward the annular space S. This facilitates securing of the tire valve unit U to the rim R.

(2) By introducing the air into the tire, the air pressure is applied to the annular space S through the opening 19. The air pressure sufficiently presses the portion of the elastic cylindrical member 15 corresponding to the securing groove 18 against the inner circumferential surface of the valve securing hole Rh. Since the portion of the elastic cylindrical member 15 at the side corresponding to the opening 19 is the free end, the portion of the elastic cylindrical member 15 corresponding to the annular space S is easily enlarged in a radially outward direction and sufficiently pressed against the rim R. This reliably stops the tire valve unit U from separating from the rim R and ensures sufficient sealing performance between the elastic cylindrical member 15 and the rim R.

(3) The tire sensor 2 is secured to the valve stem 12, or a hard cylindrical member. The tire sensor 2 is thus firmly fixed to the tire valve 1 and reliably prevented from separating from the tire valve 1 even when the tire valve unit U receives great shock or vibration caused by traveling of the vehicle.

(4) Since the tire sensor 2 is fixedly threaded to the valve stem 12, or the hard cylindrical member, the tire sensor 2 can be easily secured to and removed from the tire valve 1. The tire valve 1 and the tire sensor 2 thus can be replaced separately.

(5) The nut member 23, which is formed of hard material, is integrated with the housing 21 of the tire sensor 2 through insert molding. The nut member 23 is then threaded to the valve stem 12, which is a hard member. The tire sensor 2 is thus further firmly fixed to the tire valve 1.

(6) The nut member 23 has the friction ring 24 that stops loosening of the nut member 23. This further firmly fixes the tire sensor 2 to the tire valve 1.

The Illustrated Embodiment may be Modified as Follows

Figure 5:
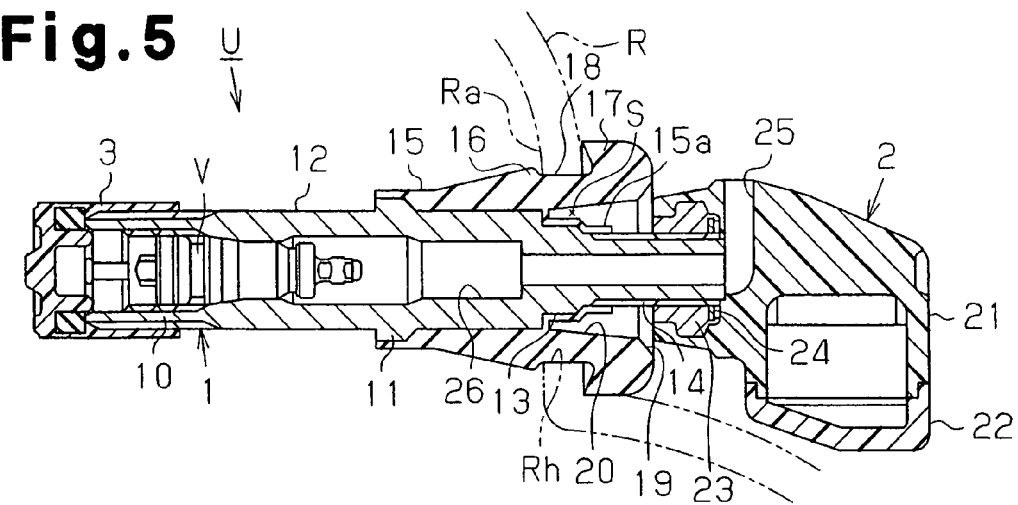
FIGS. 5 to 7 are cross-sectional views showing tire valve units of modifications.

In the embodiment illustrated in FIGS. 1 to 4, the annular space S is provided between the inner circumferential surface of the elastic cylindrical member 15 and the outer circumferential surface of the valve stem 12. However, for example, as shown in FIG. 5, the elastic cylindrical member 15 may have an extended portion 15a extending into the annular space S. The extended portion 15a covers at least a portion of the outer circumferential surface of the small diameter portion 13 of the valve stem 12.

Referring to FIG. 5, the extended portion 15a extends from an inner end of the recessed portion 20 toward the opening 19 along the outer circumferential surface of the small diameter portion 13. In FIG. 5, the length of the extended portion 15a is not sufficiently great for reaching the opening 19. However, the extended portion 15a may extend to or beyond the opening 19. The extended portion 15a, which tightly contacts the valve stem 12, increases the securing area of the elastic cylindrical member 15 with respect to the valve stem 12. This ensures further reliable securing of the elastic cylindrical member 15 to the valve stem 12.

In the illustrated embodiment of FIGS. 1 to 4, the nut member 23 is integrated with the housing 21 of the tire sensor 2 through insert molding. However, the nut member 23 may be omitted from the embodiment. For example, referring to FIGS. 6 and 7, a nut portion 21a is formed integrally with the housing 21, or, in other words, a nut portion (an internal thread) 21a is formed directly in the housing 21. This decreases the number of the components. In this case, the surface of the threaded portion 14 of the valve stem 12 may be subjected to specific treatment using fixing agent in such a manner that the fixing agent forms an anti-loosening structure. In this manner, like the embodiment of FIGS. 1 to 4, the tire sensor 2 is further firmly fixed to the tire valve 1.

Figure 6:
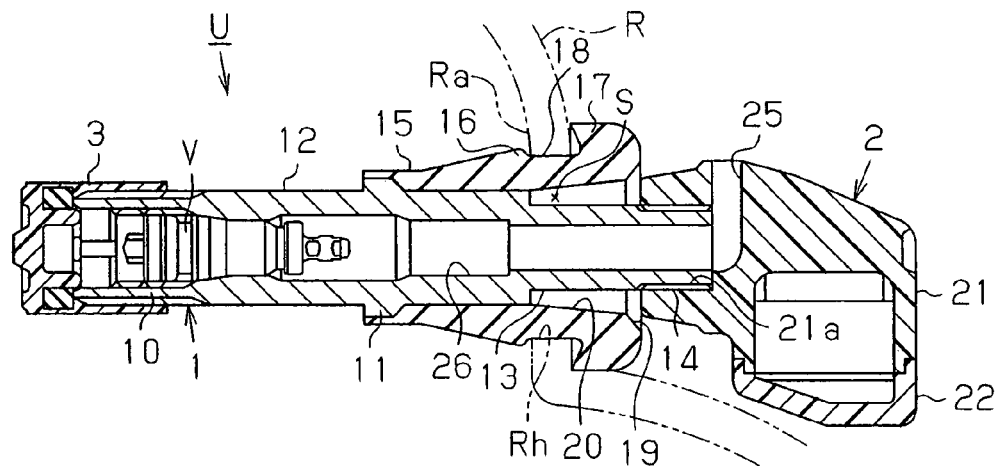
Figure 7:
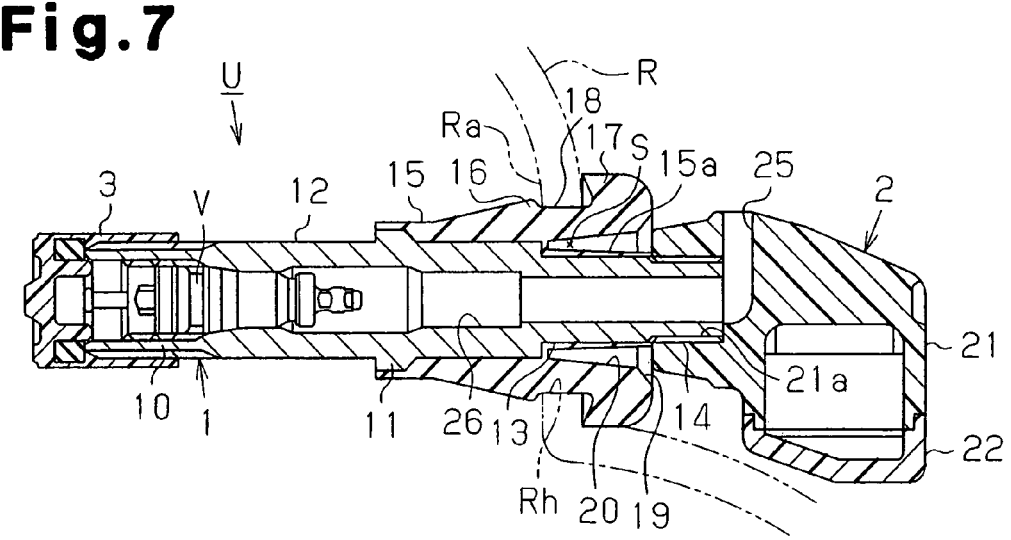

In a modification shown in FIG. 6, the extended portion 15a is not provided in the elastic cylindrical member 15. In a modification shown in FIG. 7, the elastic cylindrical member 15 has the extended portion 15a that has a length sufficiently great for reaching the opening 19.

The anti-loosening structure (the friction ring 24 or the specific machining using the fixing agent) may not be provided in the threading portion between the valve stem 12 and the tire sensor 2.

In each of the embodiments shown in FIGS. 1 to 7, the threaded portion 14 of the valve stem 12 is an external thread and the nut member 23 or the nut portion 21a is an internal thread. However, an internal thread may be provided in the valve stem 12 and an external thread may be formed in the tire sensor 2.

It should be apparent to those skilled in the art that the present invention may be embodied in many other specific forms without departing from the spirit or scope of the invention. Particularly, it should be understood that the invention may be embodied in the following forms.

The present examples and embodiments are to be considered as illustrative and not restrictive and the invention is not to be limited to the details given herein, but may be modified within the scope and equivalence of the appended claims.

What is claimed is:

1. A tire valve unit secured to a securing hole provided in a rim of a wheel of a vehicle, the tire valve unit comprising:
   a tire valve including a hard cylindrical member and an elastic cylindrical member encompassing the hard cylindrical member, the elastic cylindrical member having an annular securing groove in an outer circumferential surface of the elastic cylindrical member, a portion of the rim around the securing groove being fitted in the securing groove when the elastic cylindrical member is passed though the securing hole, the elastic cylindrical member having an inner end located in the interior of a tire attached to the rim; and
   a tire sensor fixed to the hard cylindrical member, the tire sensor being arranged in the interior of the tire and capable of detecting the condition of the tire when the tire valve unit is secured to the rim,
   wherein the elastic cylindrical member defines an annular space around the hard cylindrical member, the annular space extending from a position corresponding to the securing groove in an axial direction of the hard cylindrical member, the annular space being opened toward the interior of the tire to communicate with the interior of the tire so that the inner end of the elastic cylindrical member is a free end that is separated from the tire sensor.

2. The tire valve unit according to claim 1, wherein the tire sensor is fixedly threaded to the hard cylindrical member.

3. The tire valve unit according to claim 2, wherein an anti-loosening structure is provided in a threading portion between the tire sensor and the hard cylindrical member.

4. The tire valve unit according to claim 2, wherein the tire sensor has a nut portion threaded to the hard cylindrical member.

5. The tire valve unit according to claim 4, wherein the tire sensor has a housing, and wherein the nut portion is a nut member formed of a hard material, the nut member being integrated with the housing though insert molding.

6. The tire valve unit according to claim 4, wherein the tire sensor has a housing, and wherein the nut portion is formed integrally with the housing.

7. The tire valve unit according to claim 1, wherein the hard cylindrical member extends through the securing hole and has an inner end located in the interior of the tire, the tire sensor being fixed to the inner end of the hard cylindrical member.

* * * * *